US005914826A

United States Patent [19]

Smallwood

[11] Patent Number: 5,914,826

[45] Date of Patent: Jun. 22, 1999

[54] LIGHT SWITCH COVER PLATE WITH AUDIO RECORDING AND PLAYBACK FEATURE

[75] Inventor: Robert C. Smallwood, Leesburg, Va.

[73] Assignee: Logic Laboratories, Inc., Leesburg, Va.

[21] Appl. No.: 08/885,027

[22] Filed: Jun. 30, 1997

Related U.S. Application Data

[63] Continuation of application No. 08/685,609, Jul. 24, 1996.

[51] Int. Cl.[6] .......... G11B 31/00

[52] U.S. Cl. .......... 360/12; 360/5

[58] Field of Search .......... 360/1, 12, 69; 362/95; 174/66, 67; 340/569; 40/152

[56] References Cited

U.S. PATENT DOCUMENTS

| | | | |
|---|---|---|---|
| 4,873,469 | 10/1989 | Young et al. | 315/155 |
| 5,142,199 | 8/1992 | Elwell | 315/154 |
| 5,241,427 | 8/1993 | Lin | 360/1 |
| 5,532,689 | 7/1996 | Ousborne | 360/69 X |

FOREIGN PATENT DOCUMENTS

| | | | |
|---|---|---|---|
| WO 92/03820 | 3/1992 | WIPO | 369/69 |

*Primary Examiner*—Aristotelis M. Psitos
*Assistant Examiner*—K. Wong
*Attorney, Agent, or Firm*—Sofer & Haroun, LLP

[57] ABSTRACT

A light switch cover plate having mechanism for recording and playing back an audio sample through a speaker when the light switch is turned either on or off. Several messages can be recorded and they can be played back serially or randomly.

15 Claims, 2 Drawing Sheets

LIGHT SWITCH COVER PLATE WITH AUDIO RECORDING AND PLAYBACK FEATURE

This application is a continuation of copending application application Ser. No. 08/685,609 filed on Jul. 24, 1996.

BACKGROUND OF THE INVENTION

1. Field of the Invention

The present invention pertains to a light switch having an audio recording feature. More particularly, the present invention relates to a single unit cover plate for a light switch which can replay one or more audio samples when the light switch is turned on or off. The device may have recording capability.

2. Description of the Prior Art

Various devices exist which play an audio recording upon performance of a certain action. For example, it has become common for automobiles to play a recording when the lights are left on after the key has been removed, or when a door is ajar after the key is inserted; see U.S. Pat. Nos. 3,947,812; 4,222,028; 4,346,364; 4,383,241; and 4,839,749.

Furthermore, U.S. Pat. Nos. 3,938,120 and 4,100,581 disclose devices which attach to a door and which play a tape upon movement of the door. U.S. Pat. No. 4,715,060 is similar, but further activates an automatic telephone answering machine to playback a prerecorded message upon operation of a doorbell.

None of these devices, however, permit the user to record a message which plays back upon activation or deactivation of a light switch. It is therefore an object of the present invention to provide such a device.

Another object is to provide a device which can record multiple messages or audio samples, and play them back in serial fashion.

Yet another object of the present invention is to provide a device which can record multiple messages or audio samples, and play them back in random order.

Still another object of the present invention is to provide a switch plate for a light switch which supports components to permit replay of audio samples after the light switch is turned on or off. The cover plate being retrofittable to an existing light switch.

SUMMARY OF THE INVENTION

The foregoing and other objects are achieved by the present invention in which a switch plate cover for a light switch is provided and contains an audio assembly which will play a message through a speaker when the light switch is turned either on or off. There can be different messages for the on or off positions, or several messages in serial fashion. The messages can be prerecorded using the speaker as a microphone and controlled by a separate switch in the assembly.

BRIEF DESCRIPTION OF THE DRAWINGS

These and other attributes of the present invention will be described with respect to the following drawings in which.

DETAILED DESCRIPTION OF THE PREFERRED EMBODIMENT

Figure 1:
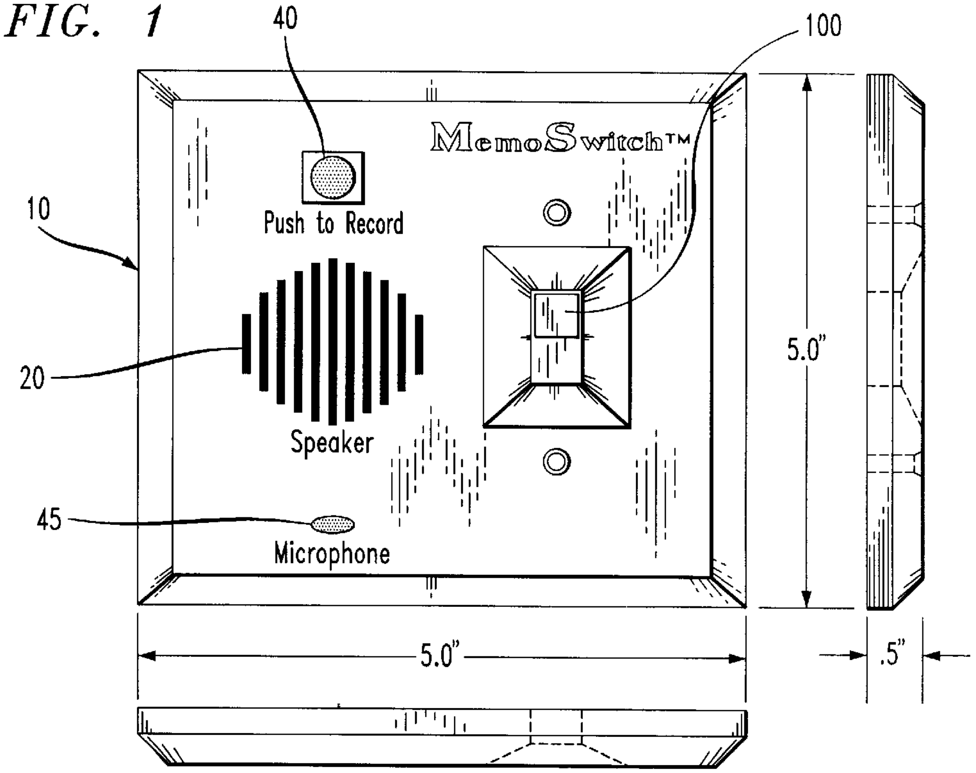
FIG. 1 is a front view of a preferred embodiment of the present invention.
Figure 2:
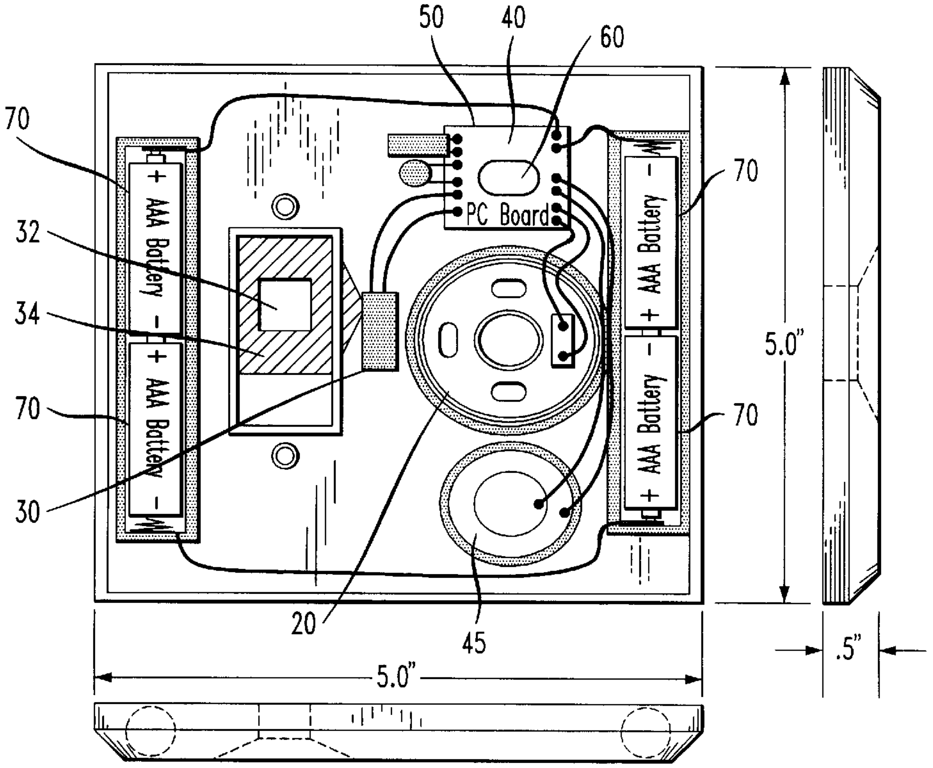
FIG. 2 is a rear view of the embodiment shown in FIG. 1.

The preferred embodiment of the present invention is shown in FIGS. 1 and 2 in which the light switch cover plate device 10 has the dimensions of a standard light switch cover plate. The device 10 illustrated in FIG. 1 is for a single light switch. Other configurations for multiple switches can be provided. The light switch 100 to which the cover plate device is attached can control a light socket or light fixture in a manner similar to standard light switches.

The light switch cover plate device 10 has a speaker 20 through which the messages or audio samples are played. A lever switch 30 is provided adjacent to the light switch 100. The light switch 100 extends through a hole 32 in slide 34. The slide 34 moves up and down with the switch 100, activating the lever switch 30. A second switch 40 is provided to initiate recording of a message or audio portion or sample.

In operation a user presses switch 40 to record an audio sample. He or she than speaks into the speaker 20, which acts as the microphone to receive the audio sample. A separate microphone 45 may be provided. When the light switch 100 is thrown to activate or deactivate the light, the slide 34 moves the lever switch 30 and the prerecorded audio sample will be played through the speaker 20.

The device 10 may be used to record multiple messages, which will then be played back in serial fashion. The messages may be reminders, motivation messages, or musical pieces. In addition the device 10 can be a message such as "Mommy loves you." and be replayed when a child turns out the light to go to bed. Such a recording can reassure a child when one or both parents are away or have not come home before the child's bedtime.

The device 10 contains a PC board 50 to which the lever switch 30 is connected. The PC board 50 has a digital memory chip 60 which contains the audio samples in digital form. The PC board 50 is powered by four AAA batteries 70. The microphone 45 and speaker 20 are also connected to the PC board 50.

Figure 3:
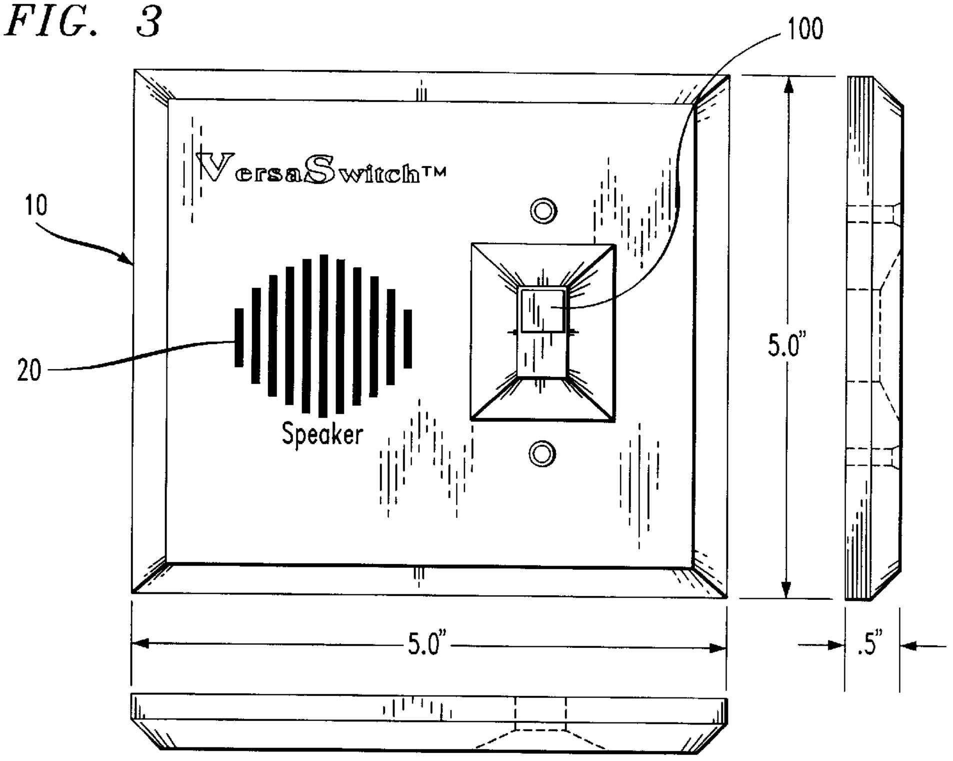
FIG. 3 is a front view of a second embodiment of the present invention.
Figure 4:
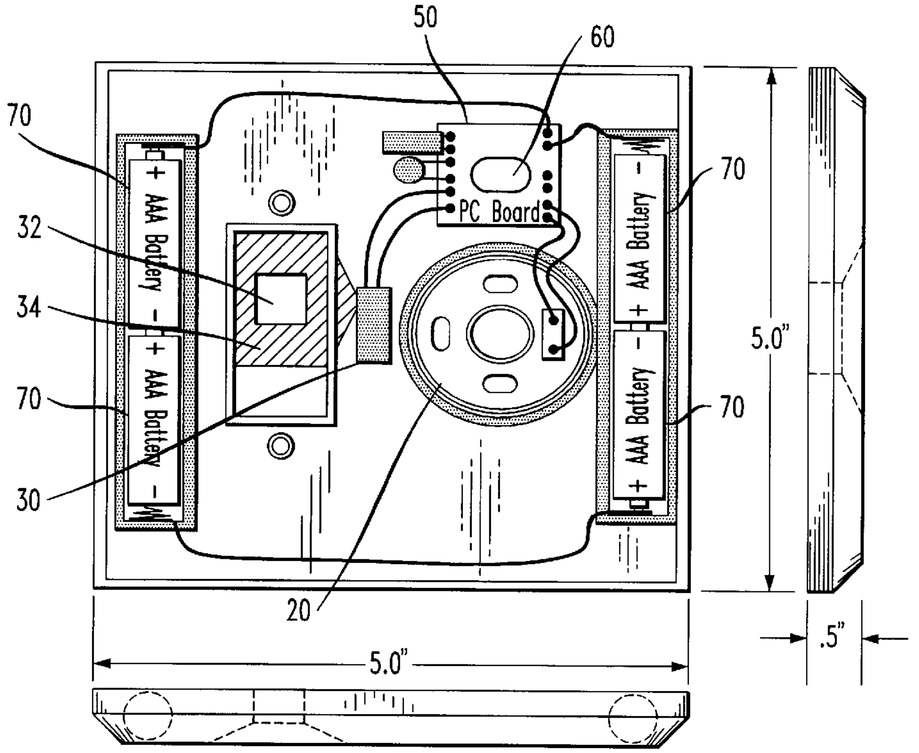
FIG. 4 is a rear view of the second embodiment of FIG. 3.

Referring to FIGS. 3 and 4, a second embodiment is illustrated in which the audio samples are prerecorded in the digital memory chip, and the microphone 45 and switch 40 are eliminated.

Having described the preferred embodiment of the light switch with audio recording and playback feature in accordance with the present invention, it is believed that the modifications, variations and changes will be suggested to those skilled in the art in view of the foregoing description, such as playing back multiple messages in random order, or providing a separate microphone from the speaker. It is therefore to be understood that all such variations, modifications, and changes are believed to fall within the scope of the present invention as defined in the appended claims.

What is claimed is:

1. An audio sample playback apparatus comprising:

a light switch cover plate having a light switch for supplying power to a light extending therethrough;

a device for playing back audio samples; and a switch for activating said playback device, wherein said playback device plays one or more of said audio samples when said light switch is turned to one of an off and on position.

2. An audio playback apparatus as recited in claim 1, wherein said device for playing back audio samples further comprises a speaker.

3. An audio playback apparatus as recited in claim 2, wherein said device for playing back audio samples further comprises a recording means.

4. An audio playback apparatus as recited in claim 3, wherein said recording means comprises a microphone.

5. An audio playback apparatus as recited in claim 4, further comprising a microphone switch for activating said microphone to record audio samples.

6. An audio playback apparatus as recited in claim 1, wherein said device for playing back audio samples further comprises a recording means.

7. An audio playback apparatus as recited in claim 6, wherein said recording means comprises a microphone.

8. An audio playback apparatus as recited in claim 7, further comprising a microphone switch for activating said microphone to record audio samples.

9. An audio playback apparatus as recited in claim 1, wherein multiple audio samples are recorded.

10. An audio playback apparatus as recited in claim 1, further comprising a digital memory for storing said audio sample.

11. An audio playback apparatus as recited in claim 1, further comprising a power source which powers said play back device.

12. An audio playback apparatus as recited in claim 11, wherein said power source is at least one battery.

13. A light switch cover plate comprising:

a device for playing back audio samples comprising:

- a digital memory chip for storing said audio samples;
- a speaker;
- a power supply for powering said playback device; and
- a switch for activating said playback device to play said audio samples when a light switch, extending through said cover plate, is turned on or off.

14. A light switch cover plate as recited in claim 13, further comprising a device to record said audio samples.

15. A light switch cover plate as recited in claim 14, wherein said device to record said audio samples comprises a microphone, a microphone switch for activating said microphone, and said digital memory chip for receiving and storing said audio samples.

* * * * *

Adverse Decision In Interference

Patent No. 5,914,826, Robert C. Smallwood, LIGHT SWITCH COVER PLATE WITH AUDIO RECORDING AND PLAYBACK FEATURE, Interference No. 104,632, final judgment adverse to the patentee rendered September 27, 2001, as to claims 1-15.

*(Official Gazette November 6, 2001)*